Nov. 12, 1968 D. K. LAUFFER ET AL 3,411,052

LOGICAL CIRCUIT ARRANGEMENT HAVING A CONSTANT CURRENT GAIN FOR CONTROLLED OPERATION IN SATURATION

Filed Oct. 28, 1965 4 Sheets-Sheet 1

INVENTORS
DONALD K. LAUFFER
ROBERT O. GUNDERSON

BY

THEIR ATTORNEYS

INVENTORS
DONALD K. LAUFFER
ROBERT O. GUNDERSON

BY

THEIR ATTORNEYS

INVENTORS
DONALD K. LAUFFER
ROBERT O. GUNDERSON

BY Louis A. Kline
John J. Matlago
Richard D. Lengel

THEIR ATTORNEYS

INVENTORS
DONALD K. LAUFFER
ROBERT O. GUNDERSON
BY [signatures]
THEIR ATTORNEYS 3,411,052

LOGICAL CIRCUIT ARRANGEMENT HAVING A CONSTANT CURRENT GAIN FOR CONTROLLED OPERATION IN SATURATION

Donald K. Lauffer, Gardena, and Robert O. Gunderson, Torrance, Calif., assignors to The National Cash Register Company, Dayton, Ohio, a corporation of Maryland Filed Oct. 28, 1965, Ser. No. 505,477
10 Claims. (Cl. 317—235)

ABSTRACT OF THE DISCLOSURE

A monolithic integrated circuit providing a logic building block for logical systems comprising a diode-transistor logical circuit (DTL) having a diode gating input circuit coupled to an emitter-follower stage and controlling an output stage to perform a switching operation in the output stage for producing high and low logical level output signals in response to high and low level logical signals applied to the diode gating circuit. Current regulation of logical circuit is provided to maintain a constant current gain of a switching transistor in the output stage during switching intervals and during operation in a state of saturation to provide a low impedance, constant current output at the low logical level. Compensation for supply voltage and temperature variations to produce the constant current gain is provided by current regulation wherein a voltage reference circuit in combination with an interstage coupling resistor regulate the bias current supplied to the switching transistor.

Figures 1, 2A:
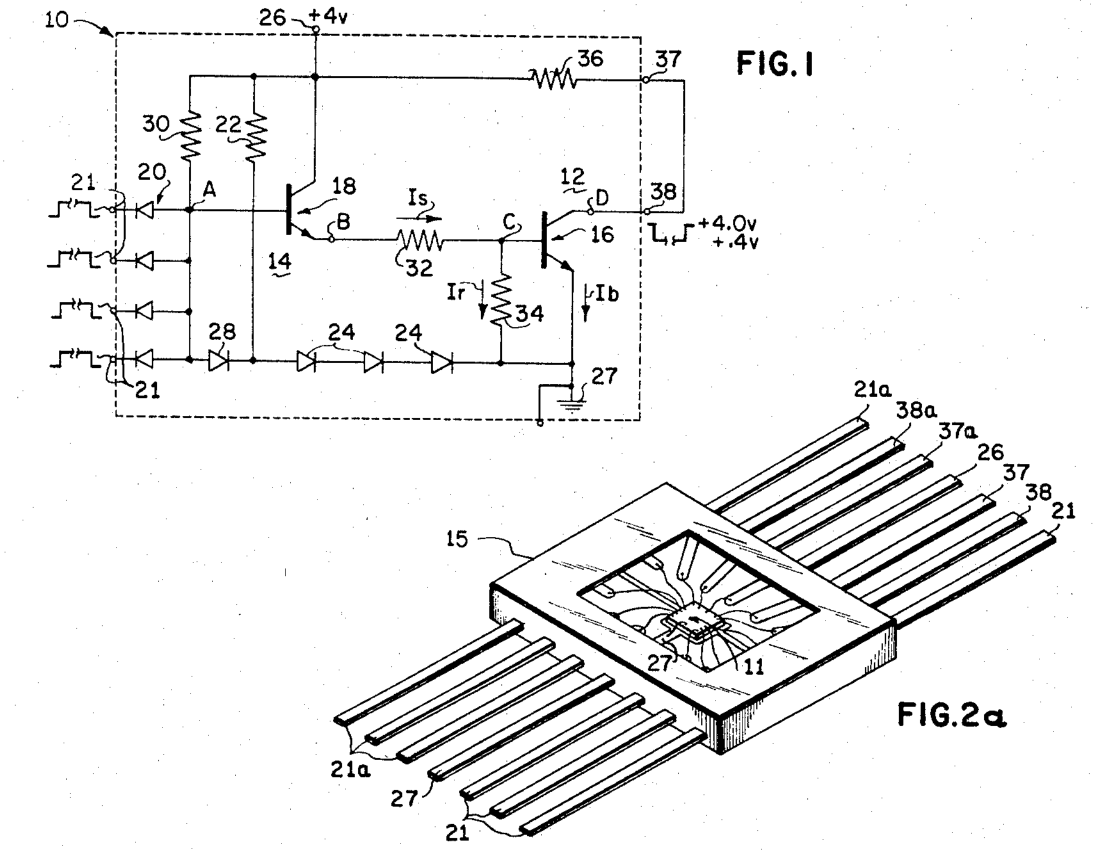

The present invention is directed to a logical circuit arrangement and more particularly to an elemental circuit which comprises a basic logic building block in the design of logical systems.

In the design of logical circuitry for data processing systems and other logical systems, one of the most important achievements is to provide a single circuit arrangement which is capable of producing a basic circuit operation common to gates, flip-flops, amplifiers and other logical circuits of one or more logical systems. This single circuit arrangement is considered hereinafter as a logic building block for data processing and other logical systems and the logical circuitry of these systems comprises assembly and interconnection of a very large number of these logic building blocks in various arrangements to provide both the individual functions of gates, flip-flops, amplifiers, and other logical operations of the system.

The provision of a single logical circuit which, when interconnected in various circuit arrangements, provides for all of the logical operations of a system, i.e., a single circuit as a logic building block of a logical system, has become of much greater importance now than before the introduction of fully integrated circuits. There are many well-known advantages in using fully integrated circuits; however, their use commercially, i.e., competitive with other circuitry, is feasible only if costs thereof can be minimized. The most critical and relatively expensive step in producing fully integrated circuits is involved in the design of a series of sequential photographic masks needed to fabricate, isolate, and interconnect the various component parts on a single silicon substrate. Once these masks are made, semiconductor processes such as solid state diffusion and epitaxial growth permit the simultaneous fabrication of all circuit elements of many logical circuits in approximately the same number of process steps required to manufacture a single transistor. Another important consideration in the use of fully integrated circuits is to avoid the need for inductors and capacitors in the circuitry and, also, to avoid the need for precision resistors. The critical factors, therefore, in minimizing costs of fully integrated circuits are to provide a minimum of different basic circuits, preferably a single logical circuit having no inductive or capacitive elements per se, or precision resistors, and which, when produced in large volume as a logic building block, is competitive in price with printed circuits or hand-wired circuits so that the advantages of higher speed and smaller size of fully integrated circuits does not become too expensive a factor in the production of logical systems whereby they would not be competitive commercially with systems using other circuitry. Accordingly, in a data processing system or other logical systems produced, particularly for business or commercial use, it is very important that a single basic circuit be developed as a logic building block for the logical circuitry of the system in order to justify the use of integrated circuits which have the advantages of higher speed operation, compactness and other known features and advantages.

Because of this emphasis being placed on the use of a single circuit as a logic building block for logical systems, a great amount of additional time and effort in research and development has been directed to perfection of the single circuit of the present invention to serve as a logic building block. The reason for this additional effort is that any resulting improvement in operation of a single circuit intended as a logic building block of logical systems is multiplied many, many times because of the very large number of these circuits being used in each system produced. It is an object, therefore, of the present invention to provide a logical circuit arrangement providing a logic building block having the foregoing features and advantages.

Another object of the present invention is to provide a basic logic building block providing improved operational stability.

A further object of the present invention is the provision of a circuit arrangement comprising a basic logic building block in which binary input signals coupled thereto are referenced to predetermined uniform high and low signal levels in the input circuit in order to provide uniform operation of circuits subjected to different environmental conditions which would tend to cause non-uniformity in input and output signals among the many logical circuits in the system.

Still another object of the present invention is to provide a logical circuit arrangement which has a high degree of noise-immunity.

Another object of the present invention is the provision of a logical circuit arrangement having immunity to A.C. and D.C. noise applied to the inputs thereof by lines interconnecting many circuits in a logical system arrangement.

A further object of the present invention is to provide a circuit arrangement which provides its own reference voltages for its active circuit components whereby the tolerances imposed on the distribution of supply voltages to the present logical circuits can be made wider and thereby avoid the expense associated with precise regulation and distribution of supply voltages to the many circuits included in logical systems.

Another object of the present invention is to provide a fully integrated logical circuit which compensates for variations in operating characteristics of individual circuits, including circuits formed from different wafers, under different environmental conditions within any logical system construction.

A further object of the present invention is the provision of a circuit arrangement having A.C., D.C., and speed stability over wide ranges of temperature among many of said circuit arrangements interconnected in a logical system.

Another object of the present invention is to provide a logical circuit arrangement having a more constant current gain under different temperature conditions.

A further object of the present invention is to provide a diode-transistor logical circuit (DTL) having an improved circuit arrangement for compensating for temperature coefficients of semiconductor elements employed therein to produce a more uniform current gain of individual logical circuits subjected to varying temperatures.

Still another object of the present invention is to provide a logical circuit arrangement having the foregoing features and advantages and operative from a single voltage source in a logical system.

Another object of the present invention is to provide improved circuit arrangements for obtaining reference voltages in fully integrated circuits.

A further object of the present invention is to provide a voltage reference circuit which produces improved stability in a fully integrated circuit.

Another object is to provide logic building blocks of the present invention in improved circuit arrangements in logical systems.

Other objects and features of the invention will become apparent to those skilled in the art as the disclosure of the present invention is made in the following detailed description of a preferred embodiment of the invention illustrated in the accompanying sheets of drawings.

Figure 2B:
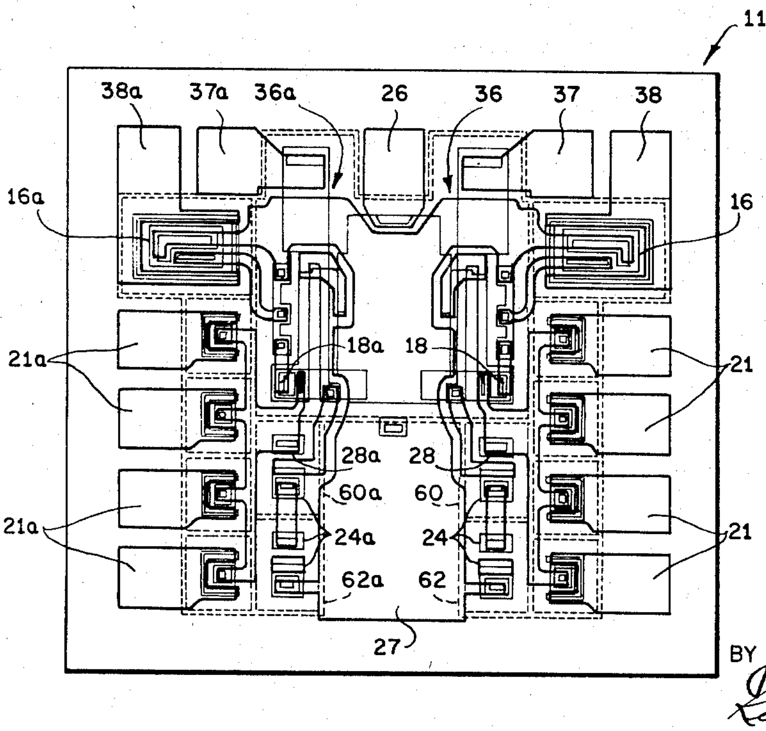
Figure 3:
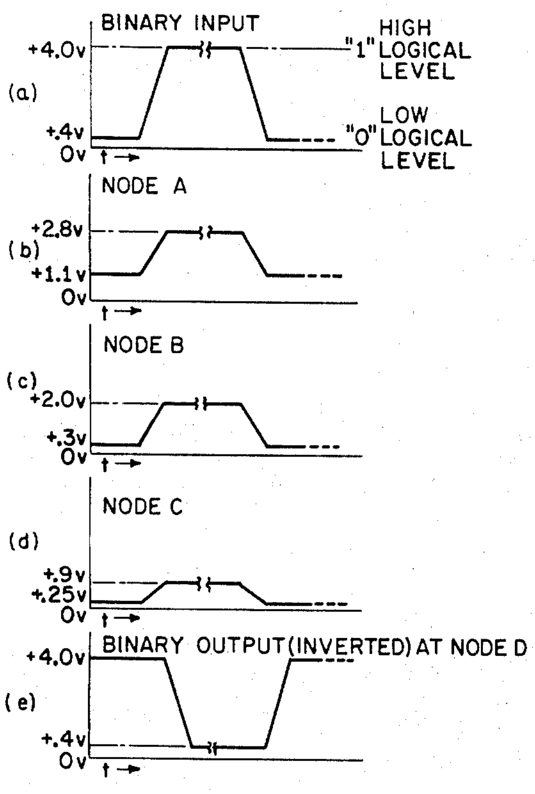
Figure 4:
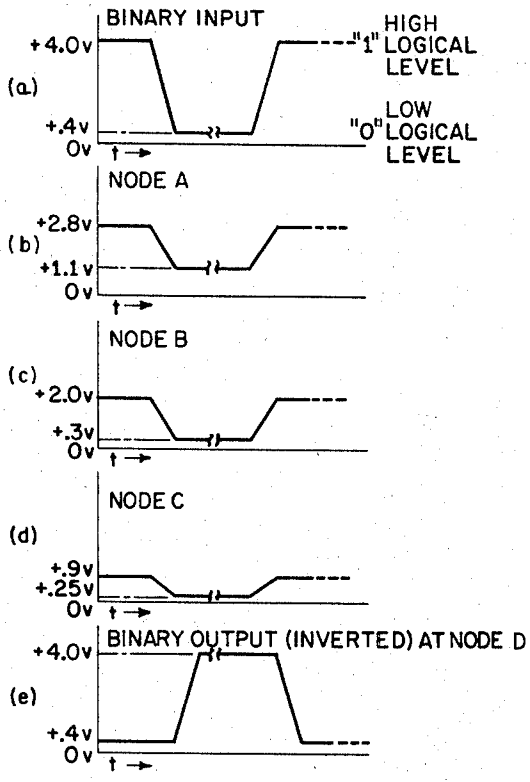
Figure 5A:
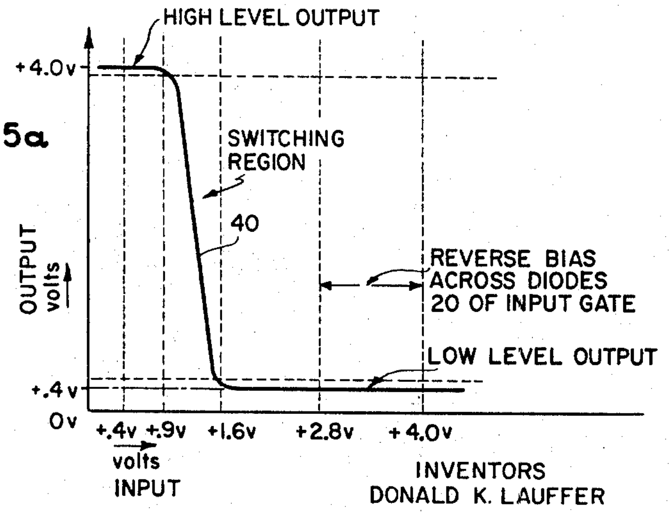
Figure 5B:
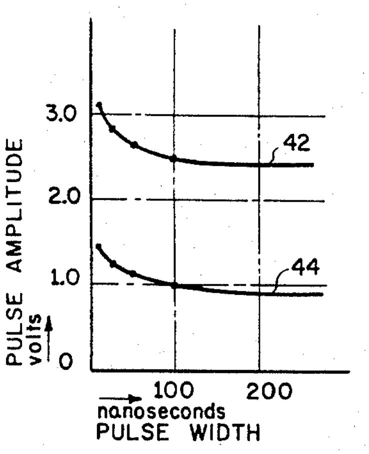
Figure 5C:
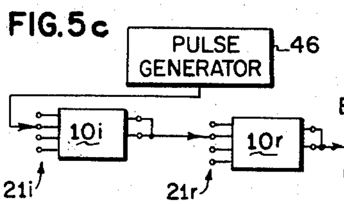
Figure 6:
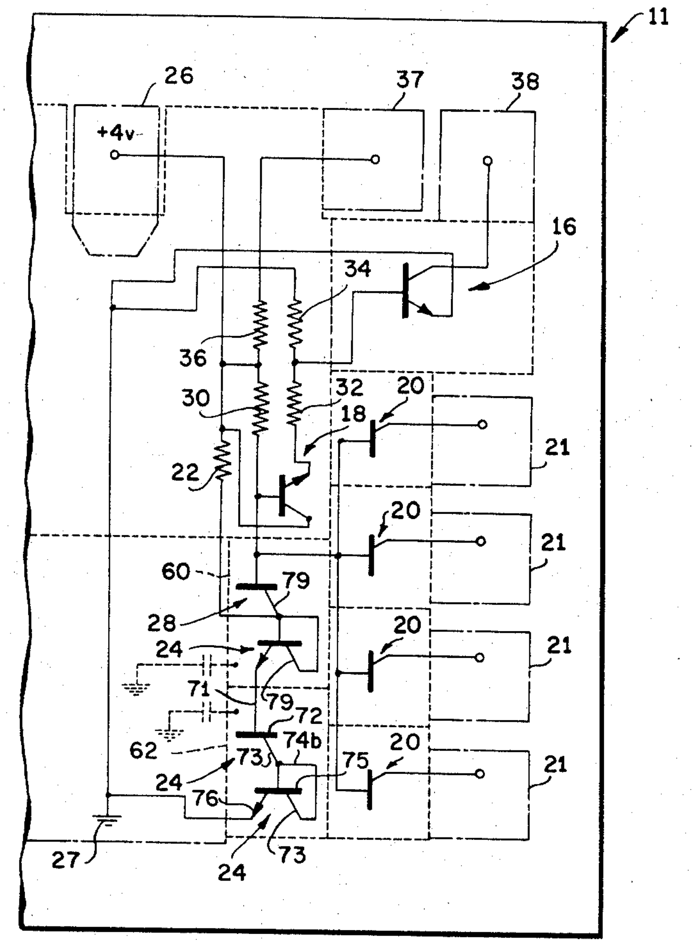
Figure 7A:
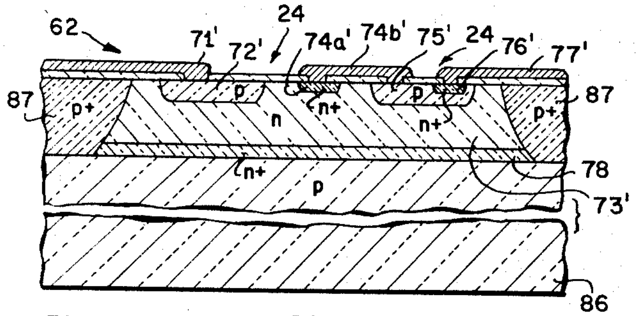
Figure 7B:
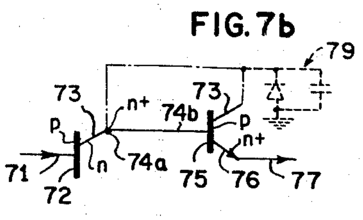
Figure 7C:
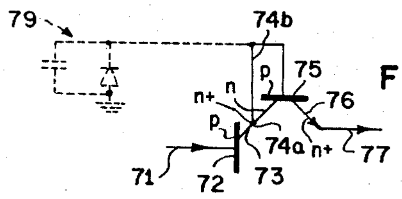
Figure 8:
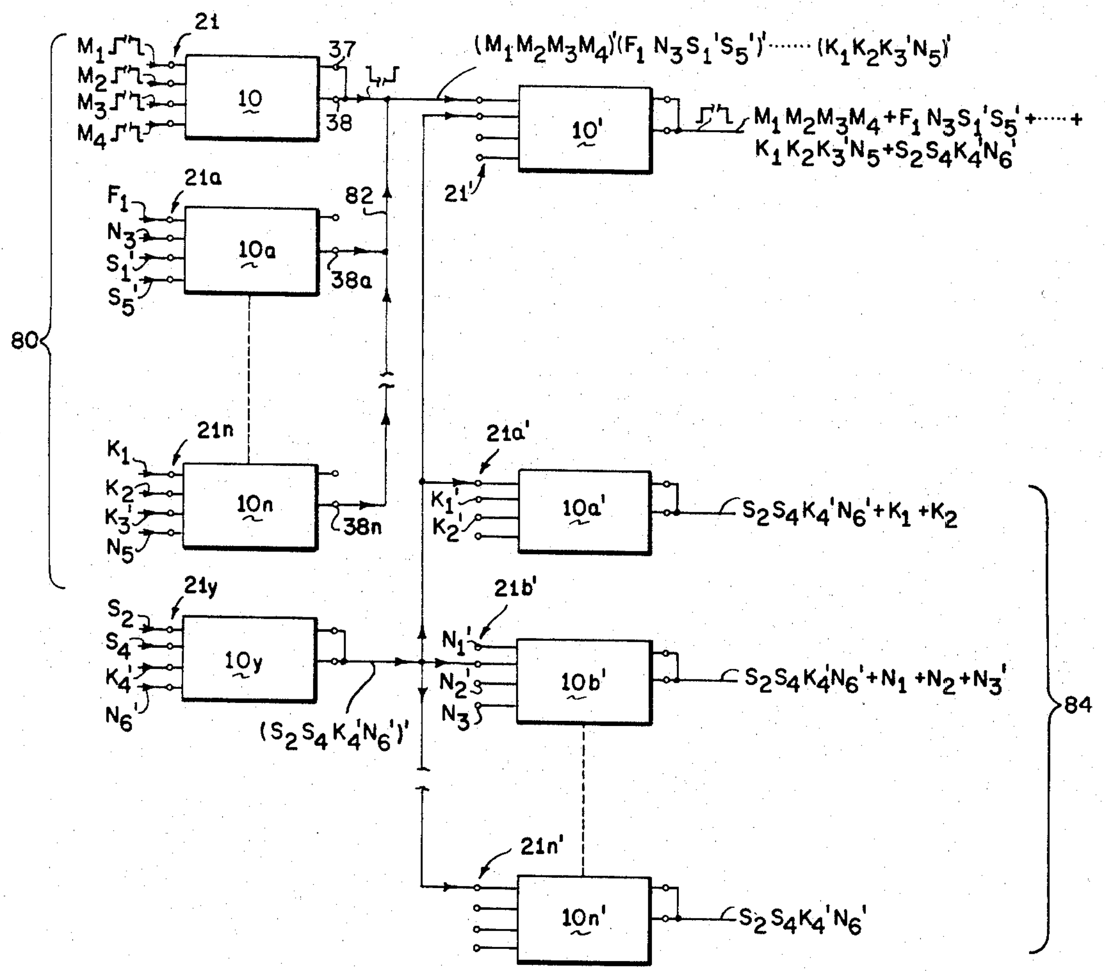
Figure 9A:
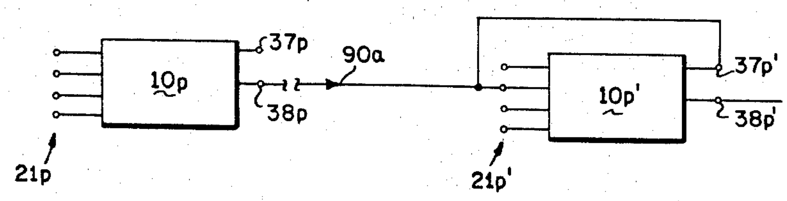
Figure 9B:
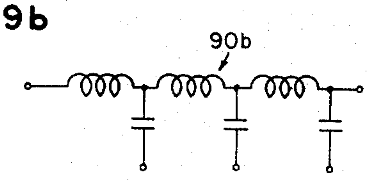

FIG. 1 is an electrical circuit diagram of a preferred embodiment of the logical circuit arrangement of the present invention;

FIG. 2*a* is an enlarged pictorial view of a typical fully (monolithic) integrated circuit package unit for the logical circuit arrangement of the present invention shown in FIG. 1;

FIG. 2*b* is a greatly enlarged plan view of the typical fully integrated circuit "chip" (or "die") disposed in the enclosure of the package shown in FIG. 2*a* which shows typical circuit patterns for forming both active and passive circuit components and interconnections therefor within a single silicon substrate for the logical circuit arrangement of the present invention;

FIGS. 3 and 4 are diagrams of typical waveforms for illustrating the operation of the logical circuit arrangement of FIG. 1 in "true" and "false" states, respectively;

FIG. 5*a* is a typical direct-current (D.C.) transfer function diagram which illustrates the improved performance of the logical circuit arrangement;

FIG. 5*b* is a diagram of typical curves plotted for illustrating the A.C. noise immunity of the circuit of the present invention;

FIG. 5*c* is a block diagram showing a typical circuit for deriving the A.C. noise immunity curves shown in FIG. 5*b*;

FIG. 6 is a greatly enlarged diagrammatic illustration of the present invention including a plan view of a portion of the integrated circuit "chip" shown in FIG. 2*a* including the isolation areas thereof and a modified electrical circuit diagram of the components and connections of a complete logical circuit of the present invention superimposed on this portion of the "chip";

FIG. 7*a* is a greatly enlarged cross-section of a particular isolation area of the integrated circuit "chip," shown in FIG. 6, for illustrating certain novel features in the construction of the present invention;

FIG. 7*b* is a modified electrical circuit diagram of the circuit construction shown in FIG. 7*a*;

FIG. 7*c* is another electrical circuit diagram showing the circuit construction shown in FIG. 7*a* in a slightly different manner than the modified circuit diagram in FIG. 7*b* to more clearly illustrate the integrated circuit construction of the present invention;

FIG. 8 is a block diagram showing a typical logical system arrangement for illustrating novel features of the present invention in a logical system;

FIG. 9*a* is another block diagram of a typical portion of a logical system arrangement for illustrating certain novel features of the present invention; and FIG. 9*b* is an electrical circuit diagram of a transmission line which illustrates the characteristics of typical lines interconnecting the logical circuit arrangement of the present invention in a logical system.

Referring now to the drawings, the improved logical circuit arrangement of the present invention comprises a logical switching circuit 10 which includes a transistor switching circuit stage 12 preceded by an emitter-follower stage 14 having its input connected to diodes 20 of a diode gating circuit. The transistor switching circuit stage 12 includes a switching transistor 16 which is operative in either its "cut-off" region or "saturation" region to perform the switching operation of the circuit 10 to provide two distinct binary logical voltage level outputs (high and low) at its collector in response to high and low signals applied to its base from the emitter-follower stage 14. In FIG. 2*a*, the logical circuit arrangement of the present invention is shown to comprise a fully (monolithic) integrated circuit package which includes a pair of logical circuits on a single block or "chip" 11 of silicon, shown in the enlarged plan view of FIG. 2*b*. A detailed description of this fully integrated circuit shown in FIGS. 2*a* and 2*b* is set forth, infra.

Referring again to FIG. 1 for a detailed description thereof, a very important provision of the logical circuit arrangement of the present invention is the circuit arrangement of the emitter-follower stage 14. The circuit arrangement of this latter stage provides many important novel features which greatly improve its own operation and the logical systems in which it is used as a logic building block. The circuit arrangement of the emitter-follower stage 14 comprises a transistor 18 having a base coupled to the diodes 20 of the gating circuit with means for referencing binary signal voltages applied to the input terminals 21 by a voltage reference circuit including a resistor 22 and voltage reference diodes (string) 24 which voltage reference circuit is connected between a voltage supply source terminal 26 and ground 27. In this voltage reference circuit, a "bleeder" current is maintained during all conditions of circuit operation. One of the functions of this reference circuit is to provide a precise clamping voltage reference to the base of the transistor 18 of the emitter-follower circuit whereby the high binary voltage levels of the signals applied to the terminals 21 are precisely controlled to a desired high voltage level at the input node A via clamping diode 28 to maintain the transistor 18 in the desired "active" region of operation.

In FIG. 1, each of the diodes 20 is shown connected to conduct current away from input node A. Diodes 20 are coupled to the input (base) of the transistor 18 of the emitter-follower stage which input is also connected to the voltage supply source terminal 26 through a resistor 30 and to the reference voltage through the clamp diode 28 which limits the high voltage (e.g., +2.8 v., as shown in FIGS. 3*b* and 4*b*) at the base of transistor 18 to the reference voltage level (e.g., +2.1 v.) plus the forward voltage drop of the clamp diode (e.g., +.7 v). The high logical voltage level (e.g., +4.0 v, as shown in FIG. 3*a*) is at the same level as the supply voltage. The high voltage level at the input of the emitter-follower circuit 14 is regulated to be substantially lower than the high logical voltage level applied to the input terminals 21 by the reference voltage and clamp diode 28, and as a result, a "back-bias" (e.g., 1.2 v.) is applied to the diodes 20. Accordingly, in addition to other circuit features, the logical circuit arrangement of the present invention is substantially immune to noise, e.g., inductively or capacitively coupled to lines interconnecting the outputs and inputs of the logical circuits of any logical system, thus making the logical circuit free from false triggering when all logical signals applied to terminals 21 are at the high logical level.

Additional advantages of providing noise immunity at the high logical level will be made evident from the later detailed description of the present invention in conjunction with the diagrams in FIGS. *5a* and *5b* and also the logical system arrangement of FIG. 8 wherein it will be made evident that noise immunity of the present circuit arrangement for high logical levels (at input terminals 21) will result in the desired noise immunity in logical systems in part because of the interconnection of outputs and inputs in cascading of logical circuits in the stages of logical systems for multilevel logic (e.g., a series of stages of NAND circuits).

The latter novel feature is considered to be one of the more important features of the present invention which in conjunction with other features, distinguishes from logical input circuits which do not provide this noise-immunity due to the fact that these prior circuit arrangements produce a "forward-bias" on the diodes of input gates at all logical levels whereby noise is coupled to the inputs thereof to make the circuit susceptible to false triggering and a resulting change in state of the circuit.

Another important feature of the present invention results from the foregoing feature in that the present logical circuit arrangement is capable of operating at a higher voltage for the high logical level, i.e., at the supply voltage level which provides for maximum separation of the binary logical levels for a given supply voltage, minimum power requirements, maximum speed, and specified maximum tolerances of circuits and circuit components. Further, noise immunity at low logical voltage levels is provided by including a substantial bias across the base-emitter junction of the switching transistor 16. Also, noise immunity is provided in a series connected pair of circuits due to the low output impedance of any preceding logical circuit arrangement supplying a low logical level signal voltage because the switching transistor 16 of a circuit supplying a low logical level signal is operating in its "saturation" region and exhibits a very low output impedance to the lines interconnecting its output to the input(s) of the following logical stage(s). Accordingly, substantial advantages are provided by the logical circuit arrangement of the present invention in of itself and logical systems where it is employed as a building block.

The operation of the logical circuit arrangement is now considered, and for the purposes of explanation, it will be assumed that the logical system in which the present circuit is contemplated being used, employs "positive" logic in which only two (logical) voltage level signals are considered, namely; the high logical voltage level signals which designate a binary "1" and the low logical voltage level signals which designate a binary "0" as illustrated by the waveforms in FIGS. *3a* and *4a*. Accordingly, the circuit arrangement of FIG. 1 performs an AND-INVERT function (NAND gate) wherein each one of the binary signals of a high logical voltage level signal (e.g., +4.0 v.) is applied to a respective one of the input terminals 21 for diodes 20 of the diode gate circuit, as shown by typical signals in FIG. 1, to produce a low logical voltage level signal (e.g., +.4 v., as shown in FIG. *3e*) at the output (collector of transistor 16). At this time, it should be noted that every one of the binary signals applied to the input terminals 21 must be at the high logical voltage level (e.g., +4.0 v.) to produce a low (inverted) voltage level signal (e.g., +.4 v.) at the output as shown by typical signals in FIG. 1. Accordingly, whenever one or more of the binary signals applied to these input diodes 20 are at the low logical voltage level (+.4 v.), the output will be at a high logical level (+4.0 v.) as shown by waveform in FIG. *4e*.

In response to the high logical level signals at each of the input terminals 21 (FIG. 1), the voltage at node A is raised to a level (e.g., 2.8 v. as shown in FIG. *3b*) to produce a "forward-bias" across the base-emitter junction of transistor 18 which places the transistor 18 in its active region ("turn on" transistor 18). When placed in this "On" stage, a substantially constant current $I_s$ (e.g., 5.5 milliamperes) is caused to flow through a series resistor 32 of a base voltage-divider circuit including also a bias resistor 34 to cause switching transistor 16 to be driven into its "saturation" region by a substantially constant base current $I_b$ (e.g., 4.6 milliamperes) produced therein by a "forward-bias" produced across the base-emitter junction of transistor 16 by a constant voltage-drop (e.g., 1.1 v.) across bias resistor 34. When transistor 16 is driven into "saturation," the current through load resistor 36 produces a voltage-drop across the resistor 36 which is substantially equal to the supply voltage (+4.0 v.) less the total forward voltage-drop across both junctions of transistor 16 (e.g., .4 v.) while operating in saturation. This establishes the low logical voltage level at the output (collector) to the voltage drop (e.g., .4 v.) across transistor 16 operating in "saturation."

In the preceding description of the operation, it was specified that a substantially constant base current $I_b$ was produced for operating transistor 16 in its saturated condition. Accordingly, the operation of the transistor 16 in saturation is accurately controlled so as not to be excessively driven into the saturation region. Controlling the operation of transistor 16 in this precise manner (without a precisely regulated, i.e., inexpensive source of supply voltage or additional reference voltage sources, except for the circuits own voltage reference circuit) is considered to be extremely advantageous in that the circuit is capable of switching to the opposite state (turn-off) in less time (fast response time) than circuits not providing this precise control of operation. The reason being that the transistor 16 does not store an excessive charge Q which induces a storage delay when being "turned-off" in response to a decrease in current $I_s$ (when transistor 18 is "turned-off" in response to a low logical level signal (+.4 v.) at any one of the diode input terminals 21).

Having considered the beneficial effects of the provision of a substantially constant base current $I_b$ for transistor 16, the manner in which it is provided will now be described. It was noted above that the substantially constant base current $I_b$ was provided without corresponding precise regulation of the voltage supplied by the voltage supply source at terminal 26 (or other additional reference supply sources except for the circuits own voltage reference circuit). For example, in the present logical circuit a (+7% to −7%) voltage variation does not affect the operation thereof and the reduction in cost of voltage supply in a logical system is substantial. In an earlier discussion of the voltage reference circuit (including resistor 22 and diodes 24 and 28) it was noted that the voltage at node A was maintained at a predetermined high clamped voltage level (when all inputs at diode input terminals 21 are high) by the connection of the clamp diode 28 to a point between resistor 22 and the first of the diodes 24 in the "bleeder" current portion of the reference circuit. Accordingly, the voltage (e.g., +2.8 v., FIG. *3b*) at node A, which causes transistor 18 to conduct, establishes a predetermined, substantially constant voltage-drop across the series resistor 32 that provides the substantial constant current $I_s$ and base current $I_b$ to the transistor 16 and divider current $I_r$ (e.g., .9 milliamperes) through the bias resistor 34. Because of the absence of a need for precise regulation of the supply voltage, expected variations in the supply voltage applied to terminal 26 will not affect the substantially constant voltage across the series resistor 32 or the substantially constant base current $I_b$ during the time period that transistors 16 and 18 are "turned-on."

The foregoing discussion was directed to the circuit stability of logical circuit arrangement of the present invention because of the control of the voltages applied thereto by the voltage referencing circuit. The following discussion is directed to the stability of this logical circuit in the presence of large temperature variations in the range of 15°C. to 55°C. (centigrade), for example, which are, in many instances, encountered in the operation of a logical system. In operation, the circuit arrangement of the present invention has been found to provide circuit stability to even larger temperature ranges. With reference to FIG. 1, it should be noted that the total current Is passes through the base-emitter junction of transistor 18 and series resistor 32, and this current Is divides through base-emitter junction of transistor 16 (I*b*) and bias resister 34 (I*r*). At the same time, current also is passed through a parallel path through diodes 24 and 28 of the reference circuit. The voltage drop across diodes 24 and 28 establishes the reference voltage between node A and ground 27 which is the parallel path for voltage stability. This circuit arrangement provides compensation for temperature variation (temperature tracking) which temperature variation effects the current gain $\beta$ of transistors 16 and 18. This compensation is provided for by maintaining the product of base current X current gain (I*b*$\beta$) constant by decreasing the bias current I*b* with higher temperatures to compensate for increasing current gain $\beta$ of the transistors 16 and 18 with higher temperatures. In the present circuit arrangement of FIG. 1, the product of base current X current gain (I*b*$\beta$) is maintained constant during the "turn-on" time as well as the "turn-off" time by the positive temperature coefficient of the series resistor 32 which increases the resistivity of the resistor 32 with higher temperatures to produce a slight decrease in the base current I*b* in transistor 16 (and also the base current in transistor 18). Also, the reference voltage across the diodes 24 and 28 decreases with higher temperatures because of the negative temperature coefficient of the diodes 24 and 28. Jointly, the positive temperature coefficient of the series resistor 32, and the negative temperature coefficient of the diodes 24 and 28, cause a slight decrease in base currents of transistors 16 and 18 with higher temperatures. As a result, the slight decrease in base current I*b* compensates for the increase in current gain $\beta$ with higher temperatures and the I*b*$\beta$ product essentially remains constant whereby the circuit is stable with temperature variations to provide a constant current output at node D. In addition to providing improved stability, the logical circuit of the present invention reduces the time delay variation with temperature variation of each of these circuits employed in a logical system. In prior art circuits, for example, a typical variation in output current of 50 milliamperes was produced over the range of temperatures from 15°C. to 55°C. This change in output current caused a variation of over 3 nanoseconds in the storage delay alone without considering the variation in base delay (time required for movement of the depletion layer at the transistor junctions). This 3 nanosecond variation in time delay of individual circuits, having a total time delay of 15 nanoseconds, for example, comprises a considerable variation in total time delay. Since as many as twenty-one of these circuits are connected in successive stages of an adder, substantial advantages are obtained in logical systems in which a minimum of time delay variations are present in the individual logical circuit arrangements of the present invention.

Considering briefly the operation of the emitter-follower stage 14 which was described earlier, it should be noted that this emitter-follower stage has advantageously been employed in the present logical circuit which stage has no "Miller Effect" delay associated therewith and since the emitter-follower is operated in its active region and does not saturate, it thereby avoids storage delay associated with operation in its region of "saturation." This feature contribtues in part to the high speed operation of the present logical circuit arrangement and any logical system using a great number of these logical circuits in the system arrangements.

Many of the improved operating characteristics of the logical circuit arrangement of the present invention are apparent from the diagrams of FIGS. 5*a* and 5*b*. In FIG. 5*a*, the typical direct-current transfer-function diagram discloses the switching characteristics of the logical circuit arrangement of the present invention. In this diagram, the input voltages and output voltages of the circuit of FIG. 1 are indicated on the horizontal and vertical axes, respectively. In response to different D.C. voltages applied to the input terminals 21 of the circuit of FIG. 1, a switching curve 40 is plotted to show the state of the output. As is evident from this curve 40, the circuit arrangement of the present invention provides D.C. stability far above that found in many other logical circuits having precisely regulated (expensive) power supplies. A typical range of input voltages below the high logical level which will assure stability in this circuit state is shown to extend from +4.0 volts to +1.6 volts (range of 2.4 volts). This extremely wide range for input voltages applied to terminals 21 provides many advantages in design and production of any logical system and far exceeds requirements considered feasible heretofore. In the range of input voltages to terminals 21 (from +4.0 volts to +2.8 volts), the present logical circuit is shown, by the curve 40 in FIG. 5*a*, to be completely immune to noise due to the back-bias on the input gating diodes 20 (FIG. 1). In this range of voltages (4.0 v. to 2.8 v.) and below this range, additional protection against D.C. noise is provided by the input reference voltage circuit described in connection with FIG. 1 and also by the additional voltage swing (2.8 v. to 1.6 v.) required to "turn-off" transistor 18 (FIG. 1). Thus, the logical circuit arrangement of the present invention provides improved D.C. stability (to remain in the proper state) and very high immunity to noise when in this state (producing an inverted low logical level output as shown in FIG. 5*a*). When in the opposite state (producing an inverted high logical level output in response to at least one low logical level signal to input terminals 21), the one or more low logical level input voltages to diodes 20 can vary from 0 v. to +.90 v. and still ensure stability (to remain in the latter state). As shown in FIG. 1, both the bias resistor 34 and emitter of switching transistor 16 are connected to ground and there is no need to provide a separate negative bias voltage source for the bias resistor 34 in order to assure stability in this latter state when adequate grounding is provided. Since no separate negative bias voltage source is required, consequently, no additional voltage regulation is necessary and further the response time of this circuit is improved over the prior art circuits requiring a negative bias source for stability which, in addition, decreases the response time of these prior art circuits because of the larger voltage swing (and storage time) required to "turn-on" a transistor controlled thereby.

Referring now to FIG. 5*b*, the diagram illustrates the improved A.C. and pulse noise immunity of the circuit of FIG. 1. In this diagram, the curve 42 in the upper part of the graph illustrates immunity from noise applied to the diode gate input terminals 21 (FIG. 1) when the circuit of FIG. 1 is in its "true" state (producing an inverted low logical level output shown in FIG. 3*e*); and the other curve 44 illustrates immunity to noise applied to the diode gate input terminals 21 when the circuit of FIG. 1 is in its "false" state (producing an inverted high level output shown in FIG. 4*e*). The noise immunity is demonstrated by applying pulses of different amplitudes and widths as indicated by the vertical and horizontal axes, respectively. The immunity to A.C. noise is demonstrated by connecting two logical circuits **10*i* and 10*r*** of the present invention in series, as shown in FIG. 5*c*, which is the minimum number of circuits necessary to restore the logical levels (double inversion for "positive" logic). Accordingly, the noise immunity is greater for narrow pulses than wider pulses as indicated by the curves 42 and 44 due to the sum of time delays between circuits 10. As the pulse width increases (horizontal axis of FIG.

5b), the amplitude of the noise required to trigger circuit 10r is shown to decrease along the curves 42 and 44 to the D.C. levels of 1.6 volts and .90 volts, respectively, shown in FIG. 5a. In accordance with this illustration, as represented by curves 42 and 44 of FIG. 5b, curve 42 is derived by first applying "negative-going" pulses from a +4.0 volt reference level and of short duration and increasing the amplitude of the pulses applied from the pulse generator 46 (FIG. 5c) until each of the circuits 10i and 10r of FIG. 5c are triggered into different states, i.e., circuit 10i is triggered from a "true" state to a "false" state, and circuit 10r is also triggered to a state wherein the output pulse amplitude equals the input pulse amplitude from the pulse generator 46. This same procedure is repeated in steps with increasingly wider pulses, as indicated in nanoseconds in FIG. 5b, to produce the curve 42. The curve 44 is derived in a similar manner using the circuits shown in FIG. 5c. However, in deriving the curve 44, the pulses applied to circuit 10i are "positive-going" from a 0 volt reference level to the amplitudes indicated on the vertical axis in FIG. 5b. From the foregoing, it should be evident that stages of logical circuits of the present invention provide a higher level of A.C. noise immunity than D.C. noise immunity, and the higher A.C. noise immunity provides a substantial advantage in eliminating false triggering from A.C. noise occurring in a logical system during the operation of the many intercoupled stages of circuits therein and particularly during switching of logical circuits during the processing of data wherein "switching transients" are coupled between the lines interconnecting the logical circuits in the system. Typical values of passive circuit components for the logical circuit arrangement of FIG. 1 which have been found to produce the desirable operating characteristics described, supra, are as follows:

| | Ohms |
|---|---|
| Resistor **22** | 1500 |
| Resistor **30** | 1200 |
| Resistor **34** | 390 |
| Resistor **36** | 200 |

As shown by the circuit diagram of FIG. 1, both active and passive circuit components, and interconnections between circuit components, except between the collector of transistor 16 and load resistor 36, are provided within the integrated circuit "chip" 11 which is shown greatly enlarged in FIG. 2b. This integrated circuit includes transistors, diodes, and resistors in the single silicon "chip" (die) 11 for two circuits identical to that shown in FIG. 1 but having a common voltage supply terminal 26 and a common ground 27. Components common to the circuit shown in FIG. 1 and FIG. 2b have the same reference numerals whereas the corresponding components of the second identical circuit have the lower case letter *a* added. Thus, in an epitaxial-planar diffusion process of forming "chip" 11, two identical circuits of the present invention are formed and the "chip" 11 is mounted in the flat package 15 shown in FIG. 2a. The terminal strips shown in FIG. 2a are given corresponding reference numbers to the corresponding terminals shown in FIG. 1. The package 15 consists of ceramic material or glass in which the terminal strips are secured. The "chip" 11 is mounted on a flat extension of the ground terminal strip 27 and the remaining terminal strip connections to terminals on the "chip" 11 are made by lead wires, as shown. The components shown on the "chip" 11 in FIG. 2b are formed in the planar processing of a p type silicon wafer substrate which may contain several hundred "chips" 11, each "chip" containing identical circuits. The wafer substrate is from 6 to 8 mils thick and has an epitaxial grown n type (conductivity) layer (approximately 1 mil thick). The resulting wafer is thick enough to be handled without excessive breakage during processing and thin enough to provide clean separation after scribing between "chips" 11. The n type epitaxial layer becomes the collector region of the transistors and an anode element of certain ones of the diodes of the two identical circuits thereon. The remaining elements of the transistors, diodes and resistors are formed in subsequent planar diffusion process steps including isolation of components by a p type (conductivity) diffusion (boron) in areas surrounding individual components, where necessary, and all of the resistors. The second p type (conductivity) diffusion process step provides transistor base regions, resistors and the anode elements of certain ones of the diodes in the isolated areas of n type (conductivity) epitaxial grown layer of silicon. At this point it should be noted that it is difficult to produce precision resistors having the same value on different wafers in this process of forming integrated circuits. Accordingly, the present logical circuit arrangement takes this factor into account by providing a circuit arrangement which does not depend upon resistors having precise resistor values by referencing the voltages in its input circuit by the voltage referencing circuit described in connection with FIG. 1. The third diffusion process step is of the n+ type (conductivity) (in excess of $2\times10^{20}$ atoms/cm.$^3$ surface concentration of phosphorus to provide contacts for aluminum leads provided in the following metallization pattern processing step). This third diffusion process step forms the transistor emitter areas, cathode regions for certain ones of the diodes and interconnections to elements formed in the first epitaxial n type areas. One or more metallization and etching processing steps follow to provide an interconnection pattern between components in the monolithic circuits. Each of the diffusion process steps in the planar process is preceded by forming a thin film of silicon dioxide (e.g., 5,000 A. thick) which is thermally grown over the epitaxial layer and "photo-resist" processing to expose only the desired areas of the epitaxial layer to diffusion.

In order to provide transistors in these monolithic integrated circuits which have A.C. and D.C. characteristics similar to those of discrete epitaxial transistors (2N2369 and 2N709 types for transistors 16 and 18, respectively, for example), the epitaxial diffused process is modified by selective diffusion of n type impurity (e.g., arsenic) in the silicon substrate before epitaxial growth of the n type layer for the collectors of the transistors 16 and 18. This modification of the integrated circuit process reduces the resistance of the collector region without degrading the collector voltage breakdown characteristics and permits higher n (conductivity) type epitaxial resistivity, thereby reducing junction capacitances.

In the foregoing discussion of monolithic integrated circuits, it was seen that many "chips" 11 were formed in each wafer. It is known that "chips" processed in different wafers often have slightly different operating characteristics and therefore produce different voltage level outputs in an operating logical system and particularly when subjected to different environmental conditions (e.g., temperature) in any logical system arrangement. Accordingly, an important feature of the present invention is to provide voltage referencing at the input to each logical circuit to avoid any dependency upon the operating characteristics of other logical circuits which may produce voltage levels at their outputs unsuited to the logical circuits using these outputs as inputs. Because of the different operating characteristics and degradation of signals on the lines interconnecting logical circuits in a system, prior art systems that provided voltage referencing of circuit outputs were unsatisfactory. The reason is that voltage referencing at the outputs of different circuits varied and the degradation of signals made them unsuitable for the many different circuits utilizing these referenced output signals as inputs. The present invention overcomes the prior art difficulties by providing voltage referencing at the inputs whereby input signals are referenced to the individual circuit having its own characteristics and using these signals in its own circuit operation. Further, the logical circuit of the present invention avoids the prior difficulties of signal degradation because there are no long circuit paths for the signals to pass before use since the input signals are referenced in each of the individual circuits at the respective input circuits thereof, as set forth in the description of FIG. 1.

Referring now to FIG. 6 in conjunction with FIG. 2*b*, the modified electrical circuit diagram shown in FIG. 6 is arranged to conform to the layout of the components and connections in one-half of integrated circuit "chip" 11 shown in FIG. 2*b* to illustrate certain novel features of the logical circuit arrangement of the present invention and particularly those novel features disclosed in the construction of the voltage referencing circuit. These novel features are directed to the manner in which diodes 24 of the voltage reference diode string and clamping diode 28 are formed in a fully integrated circuit "chip" 11 to provide the advantages of minimizing the number of isolation regions and, also, to provide a circuit having improved voltage referencing characteristics in the logical circuit of the present invention. As shown in FIGS. 6 and 2*b*, diodes 24 of the voltage reference circuit and clamping diode 28 of the single logical circuit are formed in two isolation regions 60 and 62 only in the "chip" 11. Further, for each pair of diodes in regions 60 and 62, only a single collector is provided, e.g., single collector 73 in n type epitaxial layer 73', which is shown in FIG. 7*a* for the pair of diodes 24 in region 62. Since the principles now being considered are the same for each pair of diodes in the respective regions 60 and 62, the construction of only isolation region 62 will be discussed and shown in detail herein. Accordingly, FIGS. 7*a*, 7*b* and 7*c* illustrate the integrated circuit construction and circuit for diodes 24 in isolation region 62. In FIG. 7*a*, the isolation region 62 of the integrated circuit "chip" 11 is shown in cross section to clearly illustrate the construction thereof. FIG. 7*b* shows a modified circuit diagram of the circuit formed in the isolation region 62, shown in cross section in FIG. 7*a*. FIG. 7*c* is a circuit diagram further modified from the diagram shown in FIG. 7*b*, to illustrate more clearly by circuit diagram, the actual construction of the integrated circuit which consists of a common collector 73 for both of these diodes 24 in a single isolation region 62.

Referring again to FIG. 7*a*, the reference numbers for the diffusion layers and metallization areas in isolation region 62 have been primed which have corresponding parts shown in the circuit diagram of FIGS. 6, 7*b* and 7*c*. As shown in FIG. 7*a*, the isolation region 62 is formed on the p type (boron) silicon (in the range of 6 to 8 mils thick with a resistivity of approximately 10 ohm cm.). The epitaxial layer 73' (collector 73) is n type silicon (phosphorus) approximately 1 mil (1/1000 inch) thick with a resistivity of 0.5 ohm cm. A "buried" layer 78 is a heavily doped region (in excess of $10^{19}$ atoms/cm.) of n+ type silicon (arsenic). The "isolation" diffusion step produces the isolation region 62 by forming an area 87 of p+ type (boron) material surrounding the isolation region 62. The base regions 72' and 75' are formed of p+ type (boron) material (FIG. 7*a*) in the next diffusion step. In base region 75', the next diffusion step produces the emitter region 76' of n+ type material (phosphorus). In this same diffusion step, n+ type contact region **74*a*' is formed in the n type layer 73'. Contact region 74*a*' makes contact to the subsequently formed section 74*b*' of the metallization pattern to connect the n type collector region 73' and p type base region 75'. Lead 74*b* corresponding to section 74*b*', and other leads 71 and 77** (FIG. 7*b*) corresponding to sections 71' and 77', are formed in the pattern forming metallization step of the integrated circuit forming process.

The resulting integrated circuit arrangement shown in FIG. 6 provides two distinct advantages in a voltage reference circuit of the logical circuit arrangement of the present invention. The first advantage is that only two isolation regions, 60 and 62, are required for four diodes 24 and 28, which is important in minimizing the complexity of the circuit and the surface area or space required on the "chip" 11 for the circuitry of the present invention. The second advantage is found in utilizing a relatively large parasitic capacitance in the voltage reference circuit (capacitance of the collector-substrate junction including the isolation junction which is shown schematically by dashed lines 79 in FIGS. 7*b* and 7*c*). Employing this capacitance to advantage to the present circuit increases the stability thereof by improving the stability of the voltage reference circuit. Thus, a relatively large capacitance, which is formed by the relatively large area between the collector region 73' and the substrate 36 and the isolation junction (between n type material of the epitaxial layer 73' and the p+ material area 87 shown in FIG. 7*a*) is introduced in the voltage reference circuit by the common collector 73. The common collector 79 (FIG. 6) for diodes 28 and 24 in region 60 also introduces a relatively large parasitic capacitance for the same reasons. Because each pair of diodes in isolation regions 60 and 62 is formed as described, the common collector for each pair must be at the same potential which avoids the necessity of providing separate isolation regions for each of the four diodes 24 and 28 of these pairs. In view of the foregoing, it should be clear that not only does the logical circuit arrangement provide advantages inherent in the circuit arrangement for integrated circuits, but also these additional advantages are provided by this novel integrated circuit construction.

Referring now to FIG. 8, a typical system circuit arrangement in a logical system is shown to include several groups of logical circuits of FIG. 1, which system arrangement illustrates some of the novel features and advantages of the present invention, i.e., its capabilities in providing improved logical system circuit arrangements for improving the operation of logical systems as illustrated by typical groups of circuits 80 and 84 in these logical systems. One of these system circuit arrangements comprises the first group of NAND (AND gate function with inverted output) circuits 80 shown in FIG. 8, including logical circuits (logic building blocks) 10, **10*a* . . . and 10*n*, having logical inputs as shown, which are connected together at their collector outputs by terminals 38, 38*a* . . . and 38*n* which forms an AND gate. This AND gate is simply and easily formed by connecting their respective collectors (corresponding to collector of transistor 16 in FIG. 1) to a common line 82 which is then connected to a single one of the input terminals 21' (diode gate input) of the logical circuit 10'. It should be noted that only the first one of this group of circuits 80, circuit 10, provides a connection to its load resistor 36 (FIG. 1) which acts as a common load resistor for all of the logical circuits 10, 10*a* . . . and 10*n***. In this manner, as many as eight logical circuits can be connected together to form an AND gate for their outputs as indicated by the logical equation (product) therefor in FIG. 8 as follows:

$$(M_1M_2M_3M_4)'(F_1N_3S_1'S_5)' \ldots (K_1K_2K_3'N_5)'$$

The logical circuit 10' functions as a NAND gate (AND gate function with inverted output) as illustrated by the manner in which the group of NAND gates 80 and another logical circuit **10*y*, also functioning as a NAND gate, are coupled to separate inputs of the logical circuit 10'**. The separate (two) stages of circuits demonstrate the manner in which the logical circuit arrangements of the present invention provide a logical system in which "positive" logic is employed to provide a logical system in which the output of a single stage are inverted outputs but the outputs of second stages always provide logical signals for performance of logical operations in a logical system using "positive" logic. Thus, while inverted signals from outputs of the first stage may not be suitable for certain logical operations, e.g., storage in flip-flops and other logical storage circuits, the second inversion in the second stage restores the polarity of the logical signals for performance of logical operations in accordance with "positive" logic.

Another group of logical circuits 84, as shown in FIG. 8, illustrates the manner in which the logical circuit of the present invention provides for a large "fan-out" in logical systems. As many as eight logical circuits 10', 10*a*, 10*b'* . . . and 10*n'* are coupled to the signal logical circuit 10*y*, which is capable of accepting 28 milliamperes current from all of these circuits as shown and 400 milliamperes transient current during the voltage "fall-time" due to the change in voltage from +4.0 volts to +0.4 volt, for example. Thus, the present circuit is capable of accepting 20 milliamperes of resistor load current, 30 milliamperes from eight diode inputs of other circuits as shown in FIG. 8, 400 milliamperes transient current during voltage "fall-time" (+4.0 v. to +0.4 v.). The 400 milliamperes transient current results from an assumed 100 picofarads capacitance seen at the output, i.e., stray line capacitance and input diode capacitance of the eight circuits coupled to the output for a "fan-out" of eight as shown in FIG. 8. The typical logical circuit having the values set forth supra, provides for a steady state (D.C.) output current of 50 milliamperes with a 0.4 volt maximum output voltage and 70 milliamperes with a 0.6 volt maximum output voltage. Assuming 0.4 volt maximum lower output voltage for logical systems and corresponding output current of 50 milliamperes, a current of 20 milliamperes is accepted from the load resistor 36 (FIG. 1) and an output current of 30 milliamperes is available to the diode inputs of other circuits connected to its output terminal 38. A typical diode input of the present logical circuit requires only 3.5 milliamperes; accordingly, a "fan-out" of eight would require only 28 milliamperes output current, which is well within the available output current of 30 milliamperes. At this point it should be noted that the present circuit arrangement 10 of FIG. 1 is not limited in application to driving other logical circuits and is capable of driving other external loads including relays, indicators, etc. Such other loads include loads having higher voltages, e.g., 10 volts, in which case a load resistor of higher resistance than load resistor 36 is preferable to reduce the drive current required therefor. Accordingly, when driving other loads by the present circuit 10, the output terminals 37, 38 are not connected and a load resistor of larger value is supplied along with the 10 volt load circuit(s).

In FIG. 9*a*, another improved system circuit arrangement is shown (block diagram) which utilizes the novel features of the logical circuit of the present invention. This system circuit arrangement is illustrated by logical gating circuits 10*p* and 10*p'* having details shown diagrammatically in FIG. 1 with one important difference, namely: the terminals 37*p*, 38*p* or 37*p'*, 37*p'* of circuits 10*p* and 10*p'*, respectively, are not connected in the same manner as corresponding terminals 37 and 38 shown in FIG. 1. Instead, the terminal 38*p* of the first stage circuit 10*p* (which is connected to the collector of the corresponding transistor 16, as shown in FIG. 1) is connected to terminal 37*p'* (and corresponding load resistor 36, as shown in FIG. 1) of the second stage circuit 10*p'*. This feature is considered to be important to most logical system arrangements which have long lines or cables interconnecting logical circuits, e.g., as illustrated in FIG 9*a* wherein a long line 90*a* is shown interconnecting the output of the first stage circuit 10*p* to the input of the second circuit 10*p'*. In most instances, lines interconnecting logical circuits in a system construction are formed into cables (groups of lines) to route the lines to different sections of the system. When these lines are long they appear as transmission lines having series inductances and parallel capacitances as indicated by the equivalent circuit for a typical transmission line 90*b* in FIG. 9*b*. Accordingly, it is desirable to properly terminate the long lines by a low impedance, e.g., at the input to logical circuit 10*p'*. For the above reasons, the long line 90*a* (FIG. 9*a*) has the characteristic impedance of a typical transmission line 90*b* (FIG. 9*b*) including inductive and capacitive reactances illustrated by the equivalent circuit therefor in FIG. 9*b*. Since the inputs to the logical circuits (e.g., circuits 10*p'*) require a diode gate of high impedance for operation, the signals on the long line 90*a* would be reflected in the absence of the system circuit arrangement described above and shown in FIG. 9*a*. This circuit arrangement, however, provides for physical placement of the load resistor (load resistor 36 in FIG. 1) at the input to circuit 10*p'* to lower this input impedance to provide proper termination of the long line 90*a* whereby reflection of signals is substantially eliminated. Thus, the present circuit arrangement shown in FIG. 9*a* provides better signal coupling to circuit inputs because it avoids reflection of signals which otherwise would occur in a logical system.

In the light of the above teachings, various modifications and variations of the present invention are contemplated and will be apparent to those skilled in the art without departing from the spirit and scope of the invention.

We claim:

1. A monolithic integrated logical circuit formed in a single block of material for producing binary output signals in response to binary signals applied to a logical input thereof comprising:

first and second transistors formed in said block, each of said transistors including a collector, base and emitter;

emitter-follower circuit means formed in said block for operating said first transistor in its active region including means for coupling the collector of said first transistor to a supply voltage source for said logical circuit and coupling said emitter of the first transistor to the base of said second transistor for supplying a regulated bias current to the base-emitter junction thereof to drive said second transistor into a controlled state of saturation to produce a regulated current output;

switching circuit means formed in said block for operating said second transistor in saturation in response to said bias current, said switching circuit means coupling said second transistor to said supply voltage source and to a second voltage level for said logical circuit;

gating input circuit means formed in said block for receiving said binary signals and coupling said signals to the base of said first transistor; and voltage reference circuit means formed in said block, said reference circuit means being constructed and arranged in said block to provide a parallel current path between the base of said first transistor and a low reference potential connected to the emitter of said second transistor, said parallel current path including means for providing a reference voltage limit for said binary signals coupled to the base of said first transistor for regulation of its operation in its active region to limit the current output thereof, said parallel circuit path further including means for regulating the current coupled to the base of said second transistor to provide a substantially constant gain in said second transistor when operating in said controlled state of saturation.

2. A monolithic integrated logical circuit formed in a single block of silicon for producing binary output signals in response to high and low level binary signals applied to a logical input thereof comprising:

first and second transistors formed in said block, each of said transistors including a collector, base and emitter;

supply voltage means providing only a single voltage for said logical circuit and a reference potential;

emitter-follower circuit means formed in said block of silicon for operating said first transistor in its active region, said emitter-follower circuit including means for coupling the collector of the first transistor to said supply voltage means, and means for coupling the emitter of the first transistor to the base of the second transistor including a series resistor and a bias resistor connecting said base of said second resistor to said reference potential;

switching circuit means formed in said block of silicon for coupling the collector of said second transistor to said supply voltage means and coupling the emitter of said second transistor to said reference potential to produce a low level binary signal at the collector of the second transistor whenever said second transistor is driven into a state of saturation;

gating circuit means formed in said block of silicon for receiving said binary signals and coupling said signals to the base of said first transistor and to said supply voltage means, said diode gating circuit including semiconductor means poled to conduct current from said supply voltage means; and circuit means having a negative temperature coefficient connected between the base of said first transistor and said reference potential for regulating the bias current through said bias resistor to compensate for variations in said supply voltage and a positive temperature coefficient of said series resistor to provide a constant gain for said second transistor for controlling its operation in the state of saturation.

3. A diode-transistor logical circuit formed in a single block of material for producing binary output signals in response to high and low voltage level binary signals applied to the logical inputs thereof comprising:

first and second npn transistors formed in said block, each of said transistors including a collector, base and emitter;

supply voltage means;

an emitter-follower circuit formed in said block of silicon for operating said first transistor in its active region including means for coupling said collector to said supply voltage means and means for coupling said emitter to the base of said second transistor for supplying a current thereto to drive said second transistor into a state of saturation;

transistor switching circuit means formed in said block for coupling said collector of said second transistor to said supply voltage means and coupling the emitter of said second transistor to a lower voltage level to produce a low voltage level binary signal at the collector of the second transistor whenever said second transistor is driven into said state of saturation;

diode gating circuit means formed in said block and coupled to the base of said first transistor and to said supply voltage means, said diode gating circuit means including a plurality of diodes formed in said block and poled to conduct current from said supply voltage means; and voltage reference circuit means formed in said block including series connected diodes each having a negative temperature coefficient connecting the base of said first transistor to the emitter of said second transistor for regulating said current to the base of said second transistor to establish a constant gain for said second transistor for regulation of operation in said state of saturation.

4. In a logical circuit arrangement for producing high and low voltage level binary signals at its output in response to high and low voltage level binary signals applied to its input, an input circuit providing regulation for voltage and temperature variations comprising:

emitter-follower circuit means including a first transistor having a collector, base and emitter for supplying a regulated bias current from said emitter in response to high voltage level binary signals applied to said input circuit;

switching circuit means including a resistor and second transistor having a collector, base and emitter, said second transistor being connected to a first logical voltage level reference node for said logical circuit and said resistor being connected in series between the base of said second transistor and the emitter of said first transistor for supplying said regulated bias current to said second transistor for driving said second transistor into a controlled state of saturation;

gating input circuit means including a first current limiting element and first semiconductor means providing a binary input for said binary signals and coupling said signals to a base node connecting the base of said first transistor to a voltage supply node at a second logical voltage level and through said first current limiting element;

and voltage reference circuit means constructed and arranged to provide a base reference voltage for signals coupled to said base node, said voltage reference circuit means including a second current limiting element connected to said voltage supply node and an input reference voltage node, and second semiconductor means having a negative temperature coefficient connected to said input reference voltage node, said reference voltage circuit further including third semiconductor means connecting said base and input reference nodes, said second and third semiconductor means establishing a substantially constant voltage between the base node and said first logical reference voltage level node to provide voltage regulation of said logical circuit and temperature regulation by producing a slight decrease in bias current with higher temperatures to compensate for the increase in current gain of the transistors with higher temperatures, said slight decrease in bias current being produced with higher temperatures as a result of the positive temperature coefficient of said resistor and the negative temperature coefficient of said second and third semiconductor means of said reference voltage circuit means.

5. In a monolithic integrated logical circuit formed in a single piece of material for producing high and low voltage level binary signals at its output in response to high and low voltage level binary signals applied to its input, an input circuit providing regulation for voltage and temperature variations comprising:

emitter-follower circuit means formed in said piece of material including a first transistor having a collector, base and emitter for supplying a regulated bias current from said emitter in response to high voltage level binary signals applied to said input circuit;

switching circuit means formed in said piece of material including a first resistor and second transistor having a collector, base and emitter, said second transistor being connected to a ground potential node for said logical circuit and said resistor being connected in series between the base of said second transistor and the emitter of said first transistor for supplying said bias current to said second transistor for driving said second transistor into a controlled state of saturation to produce a low voltage level binary signal at the output of said logical circuit;

gating input circuit means formed in said piece of material including a second resistor and first semiconductor means providing individual inputs for said binary signals and coupling said signals to a base node which connects the base of said first transistor to a high binary signal voltage level supply source for said circuit through said second resistor, said first semiconductor means being poled to conduct current from said supply source; and voltage reference circuit means formed in said piece of material constructed and arranged to provide an upper base voltage at said base node, said voltage reference circuit means including a third resistor connected to said supply source and a reference node, and second semiconductor means having a negative temperature coefficient connected to said reference node and poled to conduct current from said supply source to said ground potential node, said voltage reference circuit further including third semiconductor means connecting said base and reference nodes and poled to conduct current from said base node to said reference node to establish a current path from said base node to said ground potential node through said second and third semiconductor means, said first and second semiconductor means thereby establishing a substantially constant voltage between the base node and said ground potential node to provide voltage regulation of said logical circuit and temperature regulation by producing a slight decrease in bias current with higher temperatures to compensate for the increase in current gain of the transistors with higher temperatures, said slight decrease in bias current being produced with higher temperatures as a result of the positive temperature coefficient of said first resistor and the negative temperature coefficient of said second and third semiconductor means of said reference voltage circuit means.

6. A semiconductor circuit formed in a single block of material comprising:

A diode-transistor logical circuit formed in said single block of material, said logical circuit including a plurality of diode coupled inputs, a plurality of direct coupled active elements including a first active element coupled to said inputs and a voltage reference circuit adapted to be coupled to a voltage supply source and to said first active element for regulating the voltage applied to said first active element, said voltage reference circuit comprising a plurality of direct coupled active elements coupling said voltage supply source to a reference potential for said logical circuit and said first active element to provide a voltage limit for signals applied to said first active element to control the operation of said first active element in its active region;

said single block of material comprising a substrate of p type material, a first layer on said substrate of n type material, said first layer being divided into isolated regions, each isolated region being surrounded by p+ type material, including a single isolated region for a pair of active elements for said voltage reference circuit wherein said first layer of n type material comprises a common collector element for said pair of active elements to provide a large parasitic capacitance in said voltage reference circuit to stabilize the voltage of the voltage reference circuit;

a second layer of p type material formed into first and second separated areas of said single isolated region of said n type material to form bases for said pair of active elements and a collector-base diode in said first separated area as the first active element of said pair;

a third layer of n+ type material formed into a small area within the second separated area to form an emitter element and a base-emitter diode as the second active element of said pair; and a metallization pattern formed above said third layer for said diode-transistor logical circuit, said metallization pattern coupling said collector-base diode and base-emitter diode in said voltage reference circuit to conduct a bleeder current, said collector-base diode and base-emitter diode being interconnected within said single isolated regions by said first layer of n type material forming the common collector and said metallization pattern connecting the common collector to the base of said base-emitter diode.

7. A least one semiconductor circuit formed in a single piece of silicon material comprising:

a transistor logical circuit formed in said single block of material, said logical circuit including a semiconductor input for high and low voltage level logical signals, a plurality of direct coupled transistors of the npn type including a first transistor coupled to said input and a voltage reference circuit adapted to be coupled to a voltage supply source and to said first transistor for regulating the voltage applied thereto, said voltage reference circuit comprising a plurality of direct coupled semiconductor elements coupling said voltage supply source to a reference potential for said logical circuit and said first transistor to provide an upper voltage limit for signals applied to said first transistor;

said single piece of silicon material comprising a substrate of p type material, a buried layer of n+ material, an epitaxial grown layer on said substrate of n type material, said epitaxial grown layer being divided into isolation regions, each isolated region being surrounded by p+ type material projecting down through said layers to said substrate to isolate said epitaxial layer by applying a low potential to said p+ type material to form a pn junction which is reversed biased by said low potential, a single isolated region for each pair of semiconductor elements having a common collector for said voltage reference circuit wherein said epitaxial layer of n type conductivity material comprises said common collector element for said pair of semiconductor elements to provide a large parasitic capacitance in said voltage reference circuit;

a boron doped layer of p type material formed into first and second separated areas of each isolated region of said n type epitaxial grown layer of material to form bases for each pair of semiconductor elements and a collector-base diode in said first separated areas as the first semiconductor elements of each pair;

a phosphorus doped layer of n+ type material formed into a small area within the second separated areas to form emitter elements and base-emitter diodes as the second semiconductor elements of each pair; and a metallization pattern formed on said piece of silicon material above said phosphorus doped layer for said transistor logical circuit, said metallization pattern coupling said collector-base diodes and base-emitter diodes in said voltage reference circuit, each pair of diodes in said isolated regions being interconnected within each of said isolated regions by said epitaxial grown layer of n type material forming the common collector and said metallization pattern connecting each of the common collectors to the base of the respective base-emitter diode.

8. A logical circuit arrangement for eliminating variations in time delay in a logical system, said logical circuit comprising:

an input circuit including means for coupling high and low voltage level logical signals to an input node and voltage reference circuit means for establishing a regulated voltage limit at said node, said voltage reference circuit means including semiconductor means connected to said node and having a polarity to conduct current to a circuit reference potential;

first and second transistors each having a collector, base and emitter;

circuit means for operating said first transistor in its active region including means directly coupling said base to said input node and a resistor connecting the output of said transistor to the base of said second transistor, said first transistor being operative to produce a regulated bias current to said second transistor to drive said second transistor into a regulated state of saturation to provide for a substantially constant current output;

circuit means coupled to said second transistor for operating said second transistor in a state of saturation in response to said bias current and in a state of cut-off in the absence of said bias current to provide for said constant current and turn off said constant current, respectively, at the output of said circuit, and means coupling said transistor to said circuit reference potential to pass said bias current to said circuit reference potential when said second transistor is in a state of saturation;

said semiconductor means providing a regulated voltage across said resistor, said semiconductor means having a negative temperature coefficient to decrease the voltage across said semiconductor means and said resistor with higher temperatures, said resistor having a positive temperature coefficient to increase its resistivity with higher temperatures, the combined effect of said decrease in voltage across said semiconductor means and said resistor and the increase in resistivity of said resistor reducing the bias current with higher temperatures, said first and second transistors having a higher current gain with higher temperatures, said changes in current gain of said transistors and the changes of temperature coefficients affecting each other in said logical circuit to produce a substantially constant product of bias current and current gain to maintain the time delay of said circuit constant.

9. The logical circuit arrangement in accordance with claim 8 in which said voltage reference circuit means is constructed and arranged to establish a regulated upper voltage limit at said input node which voltage is below the high voltage level of said logical signals and said means for coupling said logical signals to said input node comprises at least one semiconductor device having a polarity to conduct current from said input node whereby the semiconductor device is reverse biased when high voltage level logical signals are applied thereto.

10. The logical circuit arrangement in accordance with claim 8 in which said first and second transistors are of the npn type and the emitter of the second transistor is coupled to said circuit reference potential which is a lower potential.

References Cited

UNITED STATES PATENTS

| | | | |
|---|---|---|---|
| 3,022,457 | 2/1962 | Doan | 307—88.5 |
| 3,217,177 | 11/1965 | Walker | 307—88.5 |

OTHER REFERENCES

Motorola Monitor, by Motorola Inc., vol. 2, No. 2, June 1964.

JOHN W. HUCKERT, *Primary Examiner.*

J. D. CRAIG, *Assistant Examiner.*

UNITED STATES PATENT OFFICE
CERTIFICATE OF CORRECTION

Patent No. 3,411,052 November 12, 1968

Donald K. Lauffer et al.

It is certified that error appears in the above identified patent and that said Letters Patent are hereby corrected as shown below:

Column 7, lines 20, 25 and 40, "Ibβ", each occurrence, should read -- Ib β --. Column 12, line 55, "$(M_1M_2M_3M_4)'(F_1N_3S_1'S_5)'$" should read -- $(M_1M_2M_3M_4)'(F_1N_3S_1'S_5')'$ --.

Signed and sealed this 17th day of March 1970.

(SEAL)
Attest:

Edward M. Fletcher, Jr.
Attesting Officer

WILLIAM E. SCHUYLER, JR.
Commissioner of Patents